March 10, 1964 J. D. SMITH ETAL 3,123,992
VALVE FOR GAS FUELED LIGHTER
Filed May 27, 1960 2 Sheets-Sheet 1

INVENTORS.
JAMES D. SMITH.
BY STEPHEN P. CHERNOCK

Ward, Neal, Haselton, Orme & McClannon
ATTORNEYS.

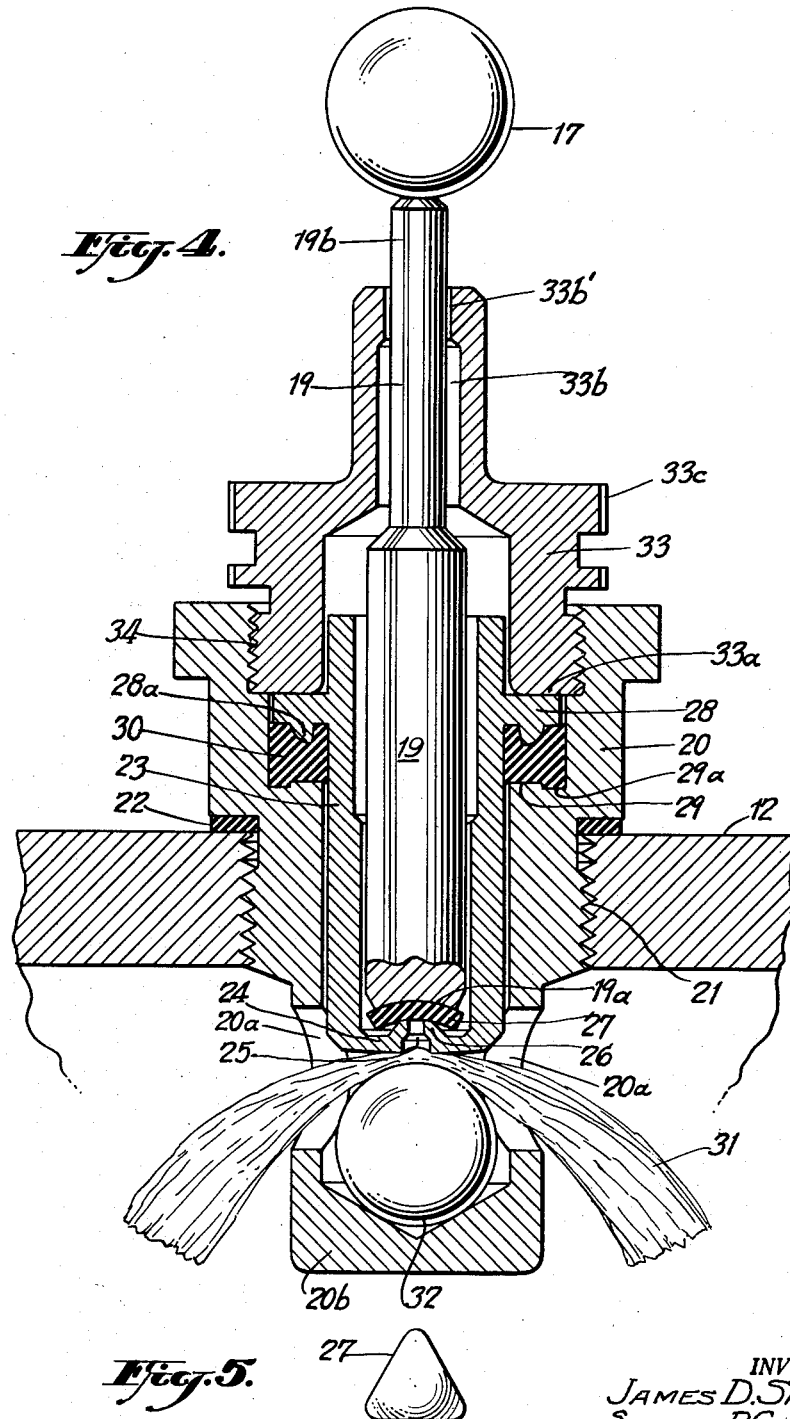

United States Patent Office 3,123,992
Patented Mar. 10, 1964

3,123,992
VALVE FOR GAS FUELED LIGHTER
James Donald Smith, Stroudsburg, Pa., and Stephen P. Chernock, Milford, Conn., assignors to Ronson Corporation, Woodbridge, N.J., a corporation of New Jersey
Filed May 27, 1960, Ser. No. 32,437
6 Claims. (Cl. 67—7.1)

This invention relates to valve means, and more particularly to a valve construction well adapted for use as a burner valve for a gas burning cigarette lighter of the pocket or table variety, which valve is designed to open easily and without sticking of the seating parts thereof and under the influence of forces arising within a distorted resilient valve member in response to the release of those forces which distort same.

In a preferred type of valve of this general class, the seating parts of the valve, which close same, include such a valve member of flat plate-like form and of relatively soft resilient material, such as rubber or one having soft rubber-like characteristics, and a seat member. The resilient valve member thus is deformable thereby easily to be pressed against such seat member which is usually of metal and through which a gas passage extends thereby to close the passage. Such resilient member is referred to herein as a plate member or valve shut-off element, although the latter element is not limited to a plate-like shape, for example, it is not necessarily flat or thin but may be other than flat and also thick.

The plate member can be pressed against the metal seat member by any suitable means, such as a valve stem. In valves of this class of the prior art, the seat member, plate and stem are usually the same in form or general shape, for example, flat. And when it is desired to open the valve, as by lifting the cap of the lighter, the forces for opening the valve and separating the seating parts are attributable to the gas under pressure within the gas chamber of the lighter. Such force is relatively small principally because the area of the valve parts is very small upon which the gas can act and, in a typical construction, is limited to the area of such gas passage through the metal seat member. Difficulty has arisen in prior constructions of this class because of the proclivity of the plate member to stick to the metal seat member when it is desired to open the valve.

Attempts have been made to overcome this difficulty by separating or disconnecting the plate member from the member which presses it against the seat member, for example, the stem, but these have not proven satisfactory.

One of the objects of the present invention is to overcome the above difficulties or to reduce same to negligible proportions.

The invention, in one aspect thereof, comprises a construction wherein the shape of the plate member, in its normal undistorted condition, is in disconformity with the shape of the metal seat member against which it is pressed. The plate member is separate from a relatively rigid member, such as the valve stem, which urges same against the seat member. For example, in a preferred form, the metal seat member has a valve seating surface comprising a crateriform protuberance, that is, such surface is frusto-conical in configuration, and the plate member is normally flat when undistorted. The plate member is pressed against such seat member by a valve closing force, for example, acting on the aforementioned valve stem, which has a concave surface which presses against the plate member to urge it fully into engagement with the aforementioned protuberance thereby to close the valve passage therethrough. This distorts the normally flat plate member so that the portion or layer thereof adjacent the protuberance is under compression and the portion or layer thereof near the opposite surface is under tension. When such valve closing force is removed or relieved, the plate member, by elastic memory, resumes its initial shape, namely, flat, and thereby separates itself from the protuberance thus preventing sticking of the valve parts and facilitating the opening of the valve.

The above and further objects and novel features of the present invention will more fully appear from the description given below when the same is read in connection with the acompanying drawings, it being understood that the latter are for purposes of illustration only and do not comprise a definition of the limits of the invention, reference for this latter purpose being had to the appended claims.

FIG. 4 comprises an enlarged view of the valve embodying the invention showing certain of the parts thereof partly in section and with parts broken away; and FIG. 5 is a plan view of a plate member employed in the present invention.

Figure 1:
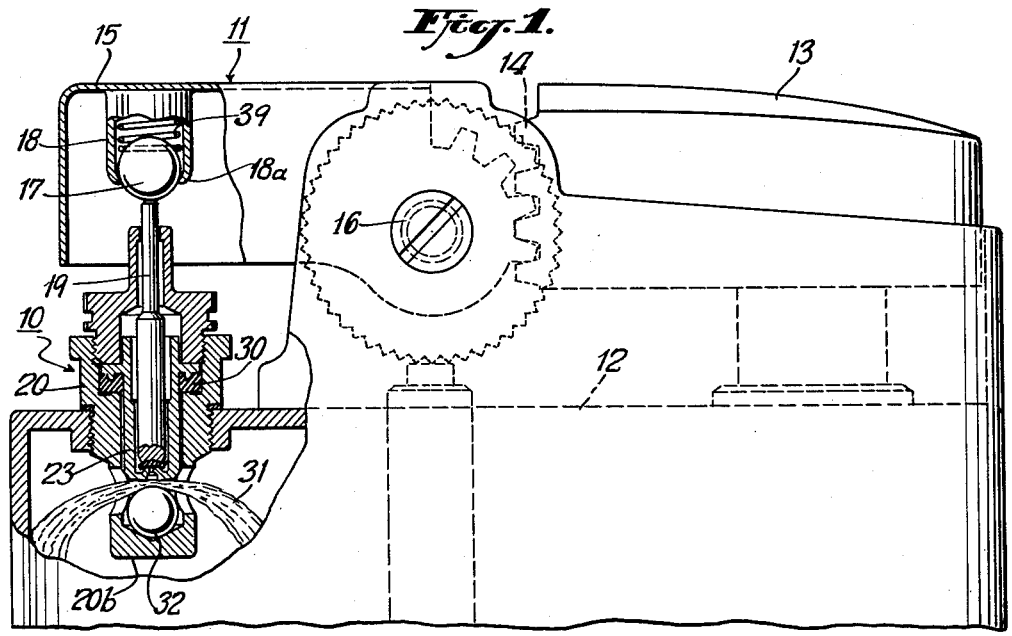
FIG. 1 is a side elevation, partly in section and with parts broken away, of the novel valve embodying the present invention in combination with a cigarette lighter.

Referring to the drawings in greater detail, with particular reference to FIGS. 1 and 4, the invention comprises a valve member 10 for a lighter 11, the latter being of the gas burning variety and including a chamber or container 12 for fuel, such as butane. The lighter is also provided with a finger piece 13 which can be pressed down, as by the thumb, and which, via a well known interconneciton, including a ratchet and gear type of mechanism 14, is adapted for raising and lowering a snuffer cap 15 which is angularly shiftable about an axis 16 and which contains a valve closing ball 17. The latter is contained within a cylindrical sleeve 18 and, in the form shown, urged downwardly by a spring 39 against inwardly turned lips 18a of the sleeve 18.

The function of the ball 17 is to coact with a valve stem 19 of the valve 10 thereby to urge same downwardly resilient when the lighter is not in use and thereby to close the valve in a manner to be more fully described hereinafter.

The valve 10 embraces the following combination:

An outer valve housing 20, which extends through a suitable opening in the casing or gas chamber 12, as by a threaded engagement therewith via threads 21, and is in fluid-tight engagement with the upper surfaces of the casing 12 by means of a housing gasket 22. An inner tubular member 23 is also provided, which is mounted for axial movement in a passage extending centrally of said valve housing, the upper end thereof, as viewed in the figures, being open but the lower or inner end thereof, which is within the casing and in direct communication with the gas chamber, being closed except for a small gas passage therethrough, this being accomplished by means of a partition 24 across the lower extremity of such inner tubular member which has formed therethrough a gas passage 25. Such partition 24 is provided with an upwardly extending protuberance 26, as viewed in FIG. 4, and through which the aforementioned gas passage 25 extends to the peak of such protuberance.

The function of the protuberance 26 is to coact with a valve plate member 27 which is of soft resilient material, such as rubber, or a material of rubber-like characteristics, and which is urged against the protuberance 26 by means of the lower extremity of the aforementioned valve stem 19. In the form shown, such lower extremity is indicated at 19a and is concave in form for reasons to be now set forth.

The plate member 27 in one form is normally of flat configuration (FIG. 3) prior to its being distorted for closing the valve. It will be noted that the top surface of the frusto-conical protuberance 26 is flat, although the protuberance generally is frusto-conical in shape.

Figure 2:
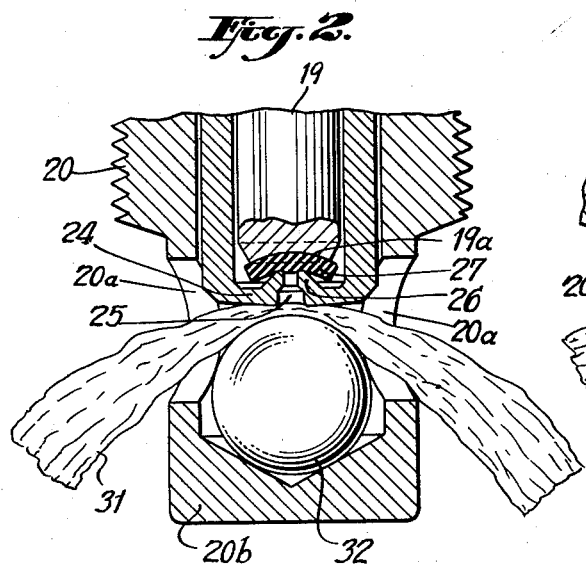
FIG. 2 is a fragmentary view on an enlarged scale of a portion of such novel valve and showing the parts thereof when the valve is closed.

The initial shape of the plate member 27, namely, flat in its undistorted condition, is selected to be in disconformity with the shape of the valve seat against which it is pressed and this for the purpose of insuring that the separate plate member 27 will, by elastic memory, return to its flat condition when the valve stem is lifted, and thereby will separate easily from such valve seat. The lower portions or layer of the plate member 27 are under compression when the valve is closed, as shown in FIGS. 2 and 4, and the upper portions or layer thereof near the top surface of the plate member 27 are under tension. The release of the forces which press the plate member against the protuberance 26 occur when there is a lifting of the lighter snuffer cap.

Figure 3:
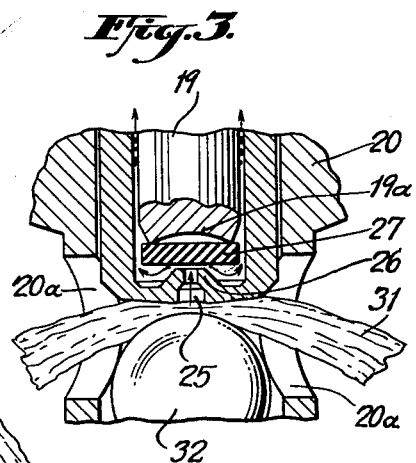
FIG. 3 is a fragmentary view on an enlarged scale of the parts shown in FIG. 2 but when the valve is open.

Thus it will be observed that the pressing of the finger piece 13, and thus the release of the downward forces on the stem 19, will cause the parts to assume the position shown in FIG. 3 wherein the resilient rubber-like plate member pulls away and separates from the metal parts against which it has been pressed. This prevents the valve from sticking and insures a positive opening of the valve. Thus gas from the interior of the chamber 12 can pass through the gas passage 25, act upon the under surface of the disc 27, pass into the gas passage between the stem 19 and the inner tubular member 23, and thence on to upper extremity 19b of the stem 19 which is located at the valve outlet or burner.

The inner tubular member 23 is provided with a flange-like collar 28 surrounding same and located within the passage in the outer housing 20. The latter passage is formed with a portion of the length thereof of an inner dimension only slightly greater than the outer dimension of the collar 28, such passage in the housing 20 further being conformed with a shoulder 29 at a region where the inner dimension thereof diminishes from the aforementioned value to a selected lesser value for receiving in a relatively loose fit the inner tubular member 23. Thus the inner dimension of a separate portion of the length of the aforementioned passage in the outer housing member 20 is of the selected lesser value.

A resilient gasket 30 is interposed between the aforementioned collar 28 and the shoulder 29 and is normally compressed therebetween as shown.

The lower portion (FIG. 4) of the outer valve housing 20 is in communication, as via passages 20a, with the interior of the container or gas chamber of the lighter.

A wick member 31 is interposed between the outer extremity of the gas passage 25 in the inner tubular member 23 and a support means for such wick member, in this case a ball 32, the outer housing 20 mounting said ball 32 in the lower portion 20b thereof and retaining same against axial movement relative to the inner tubular member 23. Wick 31 is immersed at least partially in liquid fuel, such as liquefied butane, within the fuel reservoir 12.

The aforementioned gasket 30 is employed in the position shown for the purpose of preventing leakage of gas from the gas chamber of the lighter via a gas passage below the gasket (as viewed in FIG. 4) and between the inner tubular member 23 and the outer housing 20.

Flame height adjusting means for the present valve construction comprises means for controlling flow through the passage 25 and includes means for compressing the wick 31 between the flat bottom surface of partition 24 and the spherical top surface of the ball 32, the degree of such wick compression controlling flow rate through passage 25 and hence the height of the flame at the burner outlet. This degree of wick compression in turn is controlled by a valve adjusting bushing 33 which is coaxial with and threadedly engaged in the passage within the outer valve housing 20, and further is positioned therein for engaging the upper surfaces of the collar 28 by means of lower surfaces 33a of such bushing 33. The threaded engagement of bushing 33 and housing 20 is indicated at 34.

Between the periphery of the upper portion 19b of the valve stem 19 and upper portion 33b' of a central passage 33b within the valve adjusting bushing 33, there is a suitable passage for the outlet of gas to feed the burner outlet which is at the top of passage 33b'.

The upper part of the valve stem 19, which is positioned within the inner tubular member 23, thus extends through the bushing 33 and its outlet passage 33b', the stem being axially shiftable within selected limits of axial motion sufficiently: (a) to compress the plate member 27 (FIG. 4); and (b) to releive such compression (FIG. 3).

The plate member 27 preferably but not necessarily is of triangular shape, as shown in FIG. 5. Such valve shutoff element or plate member 27 is of triangular shape, as shown in FIG. 5, for the purpose of centering such member whereby the outermost peripheral portions of it extend almost to the inner surface of the inner tubular member 23, as shown in FIG. 3, the latter showing a sectional view of member 27 and thus not representing fully the degree of proximity to the inner tubular member 23. Such outermost peripheral portions of the plate member are preferably slightly spaced from such inner surface of the inner tubular member. Thus the fit of the plate member 27 in such tubular member is not necessarily a "press fit," but such member is provided with parts which extend out far enough from its center to keep it well centered above the protuberance 26 whereby such plate member is substantially perpendicular to the vertical axis of such protuberance when the parts are in the positions of FIG. 3. The triangular shape of the plate member 27 is well adapted for this purpose but any suitable polygonal shape can be employed. The triangular shape provides well defined spaces between its periphery and the inner tubular member for the passage of the gas.

It is desirable to be able to adjust angularly the valve adjusting bushing 33 to shift same from one extreme of its axial motion to the other by a relatively short angular adjustment, for example, a range not in excess of about 50° or 60°, and this must be under circumstances wherein there is no gas leakage at either extreme of these angular limits. Further there should be ease of adjustment by relatively light finger pressure upon, for example, a knurled surface (adjustment wheel) such as 33c of the bushing 33.

The attainment of these objects is facilitated by means of a bead 28a which depends (FIGS. 1 and 4) from the lower surface of the collar 28 in such an attitude that it is pressed into the gasket 30.

Furthermore, in order to aid the gas sealing qualities of the gasket 30, a small annular groove 29a is formed in the shoulder 29 preferably near the outer margin thereof and this inhibits to a considerable degree leakage which otherwise might occur. The employment of the groove 29a improves the performance of the sealing means embracing the gasket 30 and its coacting metal parts by increasing the area of the sealing region, and also by making a more circuitous path which is more easily sealable than heretofore for the prevention of leakage past such gasket.

The bead 28a thus facilitates the deforming of the gasket 30 and improves the quality of the seal by a substantial amount and aids in deforming the gasket to press same into the groove 29a.

Further, we have observed the following:

In the absence of the bead 28a and employing only the flat under surface of the collar 28 for gasket compression, there is no leakage when the flame is low, that is, when the valve adjusting bushing 33 is turned to its innermost limit. However, when such bushing is adjusted to its opposite angular limit of motion, there is often leakage around the gasket 30. Furthermore, regarding friction, we have observed that it is difficult to grasp the knurled portion 33c of the adjusting bushing 33 and to turn it against the substantial friction resulting from the coaction of the flat under surface of the collar 28 and the flat top surface of gasket 30 in the absence of the bead 28a. However, when such bead is employed an entirely different action takes place in that the distortion of the gasket 30 occurs in a different manner whereby it is seprated and thrust on either side of the depending bead 28a and thus as to its upper portions is forcefully divided and displaced sideways, as viewed in FIG. 4, rather than merely squeezed from the top and bottom between flat surfaces. As a result friction is susbtantially lessened by the coaction of the gasket 30 and the bead 28a.

Furthermore, regarding the life of the threads 34, in the absence of the bead 28a, there is a substantial load on such threads which is lessened by the employment of such bead. The continual use of the knurled portion or adjustment wheel 33c has heretofore produced an early wearing out of the threads which can produce a destruction and stripping of the threads 34 and hence a destruction of the valve device. Friction is substantially minimized by the use of the bead 28a coacting with the gasket 30. Despite the minimized friction, an adequate seal is attained.

By adjusting or angularly shifting the valve adjusting bushing 33 so that it moves upwardly, the inner tubular member 23 follows as a result of two forces, namely, the force due to the resilient gasket 30, and the force due to the gas within the container. However, the force of the gasket 30 is the greater of the two in raising the inner tubular member 23.

In operation, when the ball 17 is lifted, as viewed in FIG. 4, the stem 19 is lifted by the resilient action of the plate member 27 in combination with the forces atributable to gas under pressure within the gas container 12. However, in the absence of gas under pressure within the container, there is no sticking of the plate member 27 to the metal parts of the valve, such as the protuberance 26. Thus it is not necessary in the present construction to have the assistance of gas under pressure to open the passage 25. The reason for this is that the plate member 27 has an elastic memory and will return to its original undistorted shape when the ball 17 is lifted and pressure is removed from the stem 19. Therefore the plate member 27 will not stick even if the gas container 12 is empty and there is no gas pressure in the passage 25.

In different and non-analogous forms of the invention, the valve shutoff element or plate member 27 need not be initially flat but can be initially of a configuration other than the shape of the surface with which it is to conform when it is in closed position as in FIG. 4. For example, such plate member may be initially of a dished or concave-convex configuration different in degree as compared to the dished configuration of FIG. 4, and its second configuration when pressed against the metal seat portion of the valve must be a different one thereby to prevent sticking by virtue of elastic memory when released. For example, it is possible to employ a shutoff plate member which is initially of a dished or concave-convex configuration of one degree but of a different degree thereof when pressed against the valve seat, as by a valve stem, thereby to cause the sealing of the valve, the plate member reverting to its initial configuration when it is no longer pressed against the valve seat, this by virtue of its elastic memory thereby pulling away from the valve seat and opening the valve and preventing sticking.

However, in the preferred form, as shown in the drawings, the shutoff plate member 27, because of its initial shape and the shape of the valve parts between which it is pressed when the valve is closed, and further because of its independent and separate character with respect to such valve parts, is capable of separating from both such parts when compression or distortion thereof is relieved.

What is claimed is:

1. In a valve device of the class described, a housing, a housing, a tubular member supported within said housing and having a partition across an end thereof, a resilient gasket positioned between said tubular member and housing to prevent the passage of fluid therebetween, a protuberance on said partition extending into said tubular member, a stem loosely positioned within said tubular member and movable axially therein, the end of said stem opposed to said protuberance being concave, passage means extending axially through said protuberance, support means positioned near said partition opposite said stem, a wick positioned between said support means and said partition in communication with said passage means, manually adjustable means mounted for movement relatively to said housing and engaging said tubular member for controlling the degree of compression of said gasket and of said wick, and resilient plate means freely positioned between said protuberance and the concave end of said stem, said plate means being shaped normally to permit the flow of gas through said passage means and into said tubular member and being conformable to the contours of said concave stem end and said protuberance to seal said passage means upon axial movement of said stem towards said partition.

2. Device in accordance with claim 1 wherein said tubular member is provided with a bead positioned for pressing into said resilient gasket thereby to separate portions of the region of said gasket so pressed and to press same on opposite sides of said bead into tight engagement with the adjacent surfaces of the tubular member and valve housing.

3. In a valve, a tubular member; a partition at one end of said tubular member, said partition having a protuberance extending into said tubular member, said partition also having a passage therethrough via said protuberance; a valve stem positioned in said tubular member for axial movement, the inner end of said stem being concave; and a deformable member of resilient material interposed between said protuberance and concave inner stem end for compression therebetween to close the valve in response to forces urging together such stem end and partition, and normally plate-shaped to bend under such compression, thereby to separate at least partially from said protuberance and said inner stem end to open the valve in response to release of said forces.

4. In a valve, a partition having a protuberance and a passage means through said protuberance, a valve member having a concave surface facing said protuberance, said valve member being mounted for relative movement toward and away from said partition, and a deformable member of resilient material interposed between said protuberance and the concave surface of said valve member for compression therebetween to close the valve in response to forces urging together such valve member and partition, said deformable member being normally plate-shaped to bend under such compression, thereby to separate at least partially from said protuberance and said concave surface to open the valve in response to release of said forces.

5. In a valve, a passageway, a stationary partition extending transversely across said passageway, said partition having a protuberance and an opening through said protuberance, a moveable valve member having a concave surface facing said protuberance, said moveable valve member being mounted to move toward and away from said partition, and a deformable member of resilient material interposed between said protuberance and the concave surface of said moveable valve member for compression therebetween to close the valve in response to forces urging said moveable valve member towards said partition, and normally plate-shaped to bend under such compression, thereby to separate at least partially from said protuberance and said concave surface of said moveable valve member to open the valve in response to release of said forces.

6. In a valve, a partition having a protuberance and a passage means through said protuberance, a valve member having a surface facing said protuberance, said valve member being mounted for relative movement toward and away from said partition, and a deformable member of resilient material interposed between said protuberance and the surface of said valve member for compression therebetween to close the valve in response to forces urging together such valve member and partition, said deformable member being normally plate-shaped to bend under such compression thereby to separate at least partially from said protuberance and said valve member to open the valve in response to release of said forces, and the adjacent surfaces of said valve member and protuberance being so shaped that when said deformable member of resilient material is deformed therebetween one surface thereof is concave and the other surface thereof is convex.

References Cited in the file of this patent

UNITED STATES PATENTS

| | | |
|---|---|---|
| 1,249,090 | Hoff | Dec. 4, 1917 |
| 1,758,471 | Schmidt | May 13, 1930 |
| 2,196,798 | Horstmann | Apr. 9, 1940 |
| 2,447,510 | Langdon | Aug. 24, 1948 |
| 2,637,990 | Aronson | May 12, 1953 |
| 2,657,563 | Burchett | Nov. 3, 1953 |
| 2,823,006 | Hare | Feb. 11, 1958 |
| 2,920,859 | Holmes | Jan. 12, 1960 |
| 2,952,439 | Koons | Sept. 13, 1960 |
| 3,006,406 | Goddard | Oct. 31, 1961 |

FOREIGN PATENTS

| | | |
|---|---|---|
| 1,200,837 | France | July 6, 1959 |